United States Patent
Bertrem

[15] 3,656,712
[45] Apr. 18, 1972

[54] BUTTERFLY VALVE

[72] Inventor: Bradley E. Bertrem, Tulsa, Okla.

[73] Assignee: Dover Corporation, Tulsa, Okla.

[22] Filed: June 19, 1970

[21] Appl. No.: 47,752

[52] U.S. Cl. .................................................. 251/306
[51] Int. Cl. .............................. F16k 1/226, F16k 25/00
[58] Field of Search ............................... 251/306, 173

[56] References Cited

UNITED STATES PATENTS

| | | | |
|---|---|---|---|
| 3,329,398 | 7/1967 | Goldsmith | 251/306 |
| 3,399,863 | 9/1968 | Fawkes | 251/306 |
| 3,473,784 | 10/1969 | Radford | 251/306 |

*Primary Examiner*—Henry T. Klinksiek
*Attorney*—Head & Johnson

[57] ABSTRACT

A butterfly valve for mounting between flanges having means facilitating insertion and removal from between flanges and means of retaining fluid pressure when one flange is removed, the valve body having a flow passageway therethrough and a disc rotatable in the flow passageway to close and open the valve, the valve body having opposed paralleled planar faces which are engaged by spaced apart flanges, the valve body having annular grooves in each face and a gasket received in each annular groove, the valve having a resilient liner therein of length equal to or less than the length of the valve body so that no part of the liner extends beyond the valve faces.

2 Claims, 6 Drawing Figures

INVENTOR.
BRADLEY E. BERTREM

BY Head & Johnson
ATTORNEYS

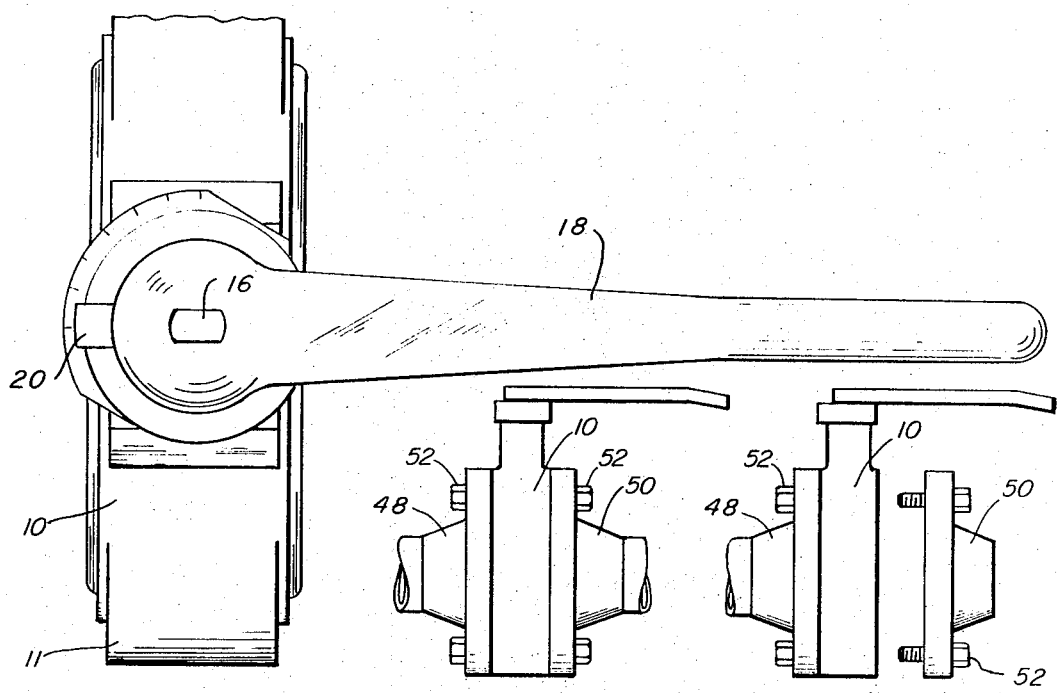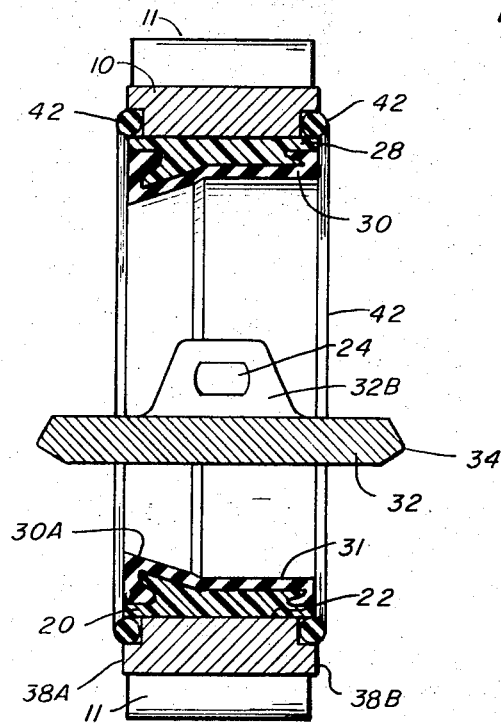

BUTTERFLY VALVE

BACKGROUND AND SUMMARY OF THE INVENTION the use of butterfly valves is well known in the industry. Butterfly type valves are favored for many applications because of their simplicity of construction, economy, quick opening and closing characteristics, and dependability. Butterfly valves have an additional important advantage, that is, they are particularly adaptable for mounting between adjacent flanges. In the flange mounted arrangement, the butterfly valve body is held in position between flanges by bolts extending between the flanges, or between the flanges and the valve body.

A problem which exists in this type of mounting of butterfly valves is that of securing a leakproof seal between the valve body and the flanges. In order to secure such seal, manufacturers have commonly used resilient inserts in the valve body, the inserts having a width as measured parallel the fluid flow path slightly greater than the width of the valve body. The longer dimension is compressed by the mating flanges providing a seal at the flange faces. By this means the resilient insert engages the flanges when the valve body is clamped into position insuring a leakproof arrangement. This arrangement is satisfactory when the working condition in which the valve is positioned is such that the flanges can be spread apart from each other when the valve is being positioned between or being withdrawn from between the flanges. In many industrial applications, however, piping is rigid or arranged such that it is extremely difficult and time consuming to move the piping to permit the flanges to be spread apart during the insertion and/or removal of a valve body. When this is the case the existing types of butterfly valves have not been completely satisfactory in that forcing the valve into position between flanges can easily damage the resilient liner causing the valve to leak and repairing the valve is difficult, time consuming and expensive.

It is sometimes advantageous to be able to remove the flange from one side of a butterfly valve while maintaining fluid pressure in the other side. Conventional butterfly valves cannot be utilized for such purpose since the sealing pressure of the valve liner against the flange, plus the fluid pressure applied against the closed valve disc, causes the liner to be displaced relative to the body.

A primary object of this invention is to provide a butterfly valve including an arrangement facilitating easy removal and reinsertion of the valve between fixed flanges.

Another primary object of this invention is to provide a butterfly valve which permits the removal of the downstream flange without removing the upstream line pressure, thus eliminating costly system drainage.

More particularly, an object of this invention is to provide a butterfly valve having improved means facilitating the positioning of the valve between flanges including improved means to effect a seal with the flanges without the possibility of damaging or impairing the valve resilient liner.

Another object of this invention is to provide a butterfly valve of the wafer or insert type including improved means of sealing between the valve body and the flanges between which valve is supported without exerting lateral force on the valve liner.

These general objects as well as more specific objects of the invention will be understood in the light of the following description and claims, taken in conjunction with the attached drawings.

DESCRIPTION OF THE VIEWS

FIGS. 1 and 2 show the valve in closed condition.

FIG. 3 is a cross-sectional view taken along the line 3—3 of FIG. 2 and showing the valve in opened position.

FIG. 4 is a top view of the valve.

FIG. 5 is a reduced size external view of a valve of this invention supported between flanges.

FIG. 5A is an external view as in FIG. 5 showing one of the flanges removed but with the other still affixed, illustrating the use of the valve in an end of line suspension arrangement.

DETAILED DESCRIPTION OF THE PREFERRED EMBODIMENT

Figures 1, 2:
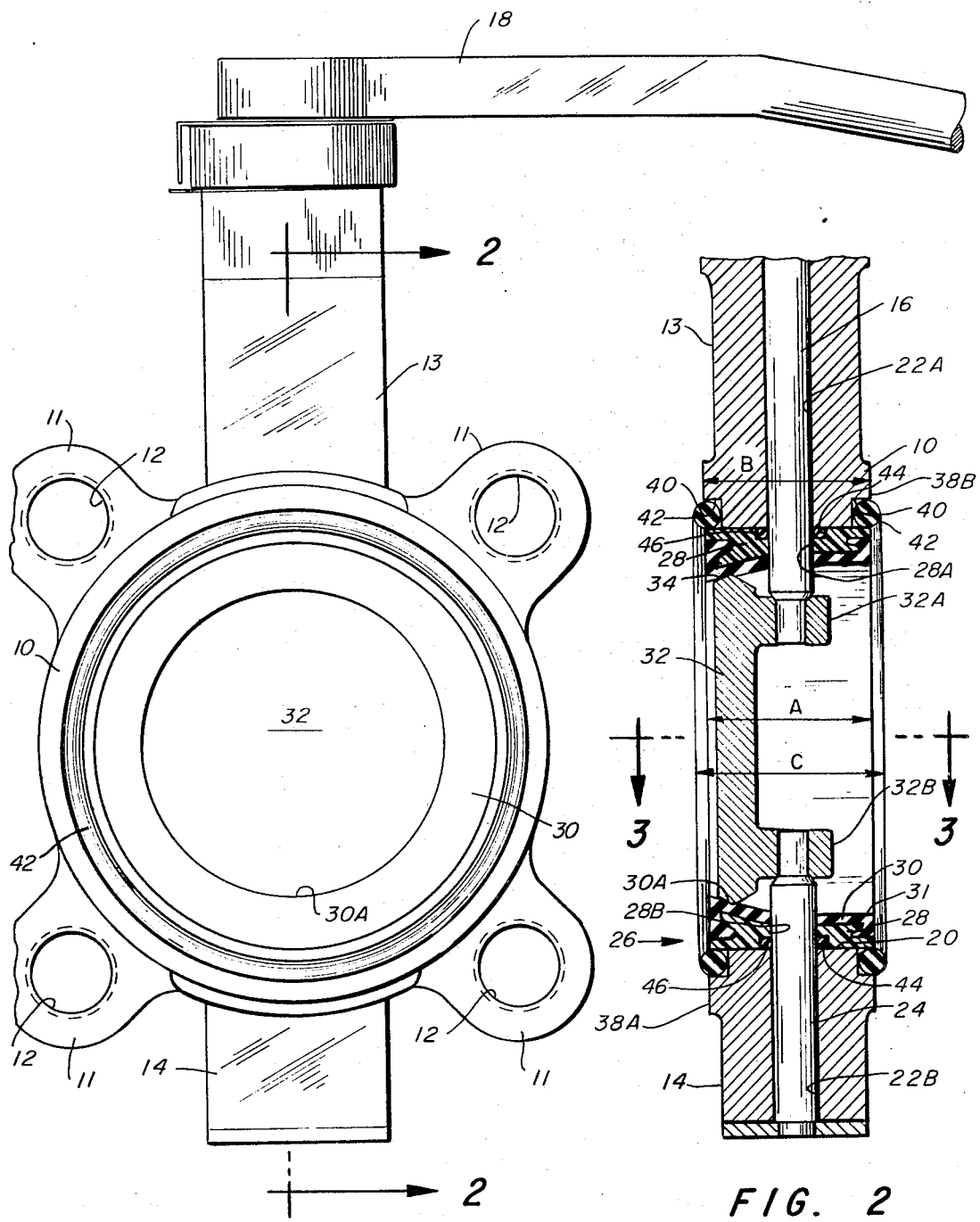
FIG. 1 is an end view of a valve embodying the design of this invention.
FIG. 2 is a cross-sectional view taken along the line 2—2 of FIG. 1.

Referring to the drawings and first to FIGS. 1 and 4, the external appearance of the valve embodying the principles of this invention is shown. The valve includes a body 10 which is generally of circular configuration with lugs 11 integrally extending from the body. Each lug has an internal opening 12 therein which is threaded from each end. The body 10 includes an upstanding upper stem boss portion 13 and a lower stem boss portion 14. An upper stem 16 extends through the upstanding stem boss portion 12 and receives a handle 18. A pointer 20 on handle 18 indicates the position of the valve, that is, whether it is opened or closed or at some intermediate position.

Referring to FIGS. 2 and 3, the internal construction of the valve can better be understood. The body 10 includes a cylindrical axial flow passageway 20 through which fluid passes through the valve when the valve is in the opened position. Intersecting passageway 20 is an upper stem opening 22A and a lower stem opening 22B. Receiving in opening 22A is the upper stem 16 which, as previously mentioned, extends to receive handle 18. Received in lower openings 22B is a lower stem 24.

Positioned within the flow passageway 22 is a resilient liner generally indicated by the numeral 26. In the illustrated arrangement the liner 26 includes two portions. The first portion is an outer circumferential portion or backing ring 28 which may be of metal or some non-metallic material such as plastic. The backing ring 28 is preferably stiff to lend strength and support to the liner 26. The second portion is an inner circumferential portion 30 which encompasses most of the backing ring 28. The inner circumferential portion 30 provides a flow passageway 31 through the valve concentric with the body flow passageway 20. A portion of the flow passageway 31 is of reduced internal diameter forming a valve seating surface 30A.

Positioned in the flow passageway 31 is a valve disc 32 having an annulur seating surface 34. The valve disc 32 includes two spaced apart boss portions 32A and 32B which receive the stems 16 and 24 as a means of rotatably supporting the disc in the valve body and for rotation of the disc between opened and closed positions. In the closed position the seating surface 30A of insert 26 is engaged by the annular seating surface 34 of the valve disc 32 to close the valve against fluid flow. When the valve is rotated to the opened position, as shown in FIG. 3, fluid is free to pass to either side of the disc.

An important aspect of the invention is the relationship of the width of the valve body compared to the width of the liner 26, the width in each case being measured parallel the direction of fluid flow through the valve.

The width A (see FIG. 2) of the liner 26 is equal to or less than the width B of the valve body 10. Width A may be slightly less than width B but in no case is it greater than width B.

Valve body 10 includes opposed, paralleled planar faces 38A and 38B. Formed in each of faces 38A and 38B is an annular groove 40, each of which receives a gasket 42 which in the illustrated embodiment is in the form of an annular O-ring. Each gasket 42 extends beyond the faces 38A and 38B in which it is positioned so that the width C between the outer extremeties of gaskets 42 is greater than the width B between the valve faces.

The annular groove 40 in each valve body face 38A and 38B is arranged so as to communicate at one edge with the passageway 30. In this way each gasket 42 engages the outer circumferential surface of liner backing ring 28. Liner backing ring 28 includes aligned openings 28A and 28B therein receiving stems 16 and 24 respectively. To insure leakproof sealing around stems 16 and 24 grooves 44 are provided in backing ring 28, each of which receives an O-ring gasket 46 which engages the stems. The engagement of stems 16 and 24 with backing ring 28 prevents the liner 26 from being displaced when the flange which ordinarily engages one face of the valve body is removed while the other is left attached and with fluid pressure therein.

When the valve is secured to a flange, gasket 42 contacts the flange and is compressed. The gasket 42 is compressed against the surfaces of groove 40 and against liner backing 28. This compressive fit serves to seal against leakage between the valve body and the flange, and between the valve body and the liner. The compression of a gasket 42 as a flange is secured to the valve body and obtains the sealing engagement abovementioned without imparting any lateral force against the valve liner 26; that is, the application of a flange to the valve body does not tend to force the liner away from the flange. In fact, the compression of a gasket 42 against the exterior circumference of backing ring 28 when a flange is applied helps hold the valve liner in position within the valve body. For this reason the flange on the downstream side of a valve in a piping system may be removed while pressure is retained by the valve on the upstream side. The only tendency to displace the valve liner 26 is the force of fluid which is resisted by the engagement of the liner backing ring 28 against the stems 16 and 24 at openings 28A and 28B.

FIG. 5 shows the valve body in normal working position between an upstream flange 48 and a downstream flange 50. Flanges 48 and 50 are secured to the valve body 10 by means of bolts 52 which engage threaded openings 12 in body lugs 11 (see FIG. 1). If flanges 48 and 50 are rigid, the valve can nevertheless be removed by removing bolts 52 and slipping the valve body from between the flanges. Since the valve liner does not extend beyond the valve body faces, it cannot be damaged either by insertion or removal of the valve.

FIG. 5A shows downstream flange 50 removed. Because of the unique design of the valve of this invention, the valve may nevertheless be utilized to retain fluid pressure in the piping affixed to upstream flange 48, thus eliminating the necessity of draining the piping system secured to one side of the valve when the piping affixed to the other side is to be removed. In contrast to the typical insert type butterfly valve marketed today, the valve of this invention is uniquely adaptable to close the end of a line.

The valve of this invention is particularly adapted to satisfy the objectives as previously set forth. When the valve is inserted between spaced flanges there is no possibility of damaging the liner 26 since the liner is of a width no greater than the width between the faces 38A and 38B of the valve body. Resilient sealing engagement however, is provided between the valve body 14 and the flanges between which it is held by gaskets 42. It can be seen that if gaskets 42 are damaged in inserting or removing the valve from between flanges, they can be very quickly replaced without disassembling the valve in any way, and the cost of replacement is very nominal. This is in great contrast to the difficulty and cost of replacing a liner 26 which has been damaged. In addition the downstream flange may be removed from the valve while the valve closes against upstream pressure without displacement of the valve liner.

While the invention has been described with a certain degree of particularity, it is manifest that many changes may be made in the details of construction and the arrangement of components without departing from the spirit and scope of this disclosure. It is understood that the invention is not limited to the illustrated embodiment as set forth herein for purposes of exemplifying the invention but is limited only to the scope of the attached claim or claims, including the full range of equivalency to which each element thereof is included.

What is claimed:

1. A butterfly valve comprising:
  1. a valve body having a flow passageway therethrough and upper and lower stem openings therein in axial alignment normal to the axis of the flow passageway, the valve body having opposed paralleled planar faces against which spaced apart flanges may be engaged to retain the valve body in a working relationship with piping or the like, each said body face having a gasket receiving groove therein encompassing and communicating with said flow passageway;
  2. a removable annular liner received in the valve body flow passageway, the liner being configured to provide an annular seating surface within the body flow passageway, the liner having diametrical coaxial stem receiving openings therein in alignment with said stem receiving openings in said valve body, the removable annular liner being formed of
    a. a liner outer tubular portion of a relatively hard inflexible material having an outer diameter substantially equal to said body flow passageway, the length of said liner outer portion measured parallel the tubular axis being equal to the distance between said body planar faces, and
    b. A liner inner tubular portion of resilient material bonded to said liner outer tubular portion, the length of said liner inner portion measured parallel the tubular axis being equal to the distance between said body planar faces;
  3. a valve disc received in said flow passageway in said liner and rotatable between an opened and closed position, in said closed position the periphery of the disc having engagement with said liner inner portion to close the valve against fluid flow therethrough and in said opened position the disc being in a plane parallel the axis of the flow passageway through said liner permitting fluid flow to either side of the disc and through said liner, said disc having stem receiving means thereon;
  4. stem means receiving in said stem openings in said body and secured to said valve disc stem receiving means, a portion of said stem means extending exteriorly of said body and affording means of rotatably positioning said valve disc; and
  5. an annular resilient gasket received in the said grooves in each of said body faces, said gaskets sealably engages the outer diameter of said liner outer portion, said gaskets normally extending sealably beyond said faces to resiliently engage and seal against flanges when the valve is positioned in a working relationship without imparting lateral force against said liner.

2. A butterfly valve according to claim 1 in which said liner includes a reduced internal diameter portion forming an annular seating surface engaged by said disc periphery when said disc is in the closed position.

* * * * *